United States Patent
Sheynblat

(10) Patent No.: US 7,533,569 B2
(45) Date of Patent: May 19, 2009

(54) SENSOR-BASED ORIENTATION SYSTEM

(75) Inventor: Len Sheynblat, Hillsborough, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 11/686,945

(22) Filed: Mar. 15, 2007

(65) Prior Publication Data

US 2007/0214886 A1  Sep. 20, 2007

Related U.S. Application Data

(60) Provisional application No. 60/783,196, filed on Mar. 15, 2006.

(51) Int. Cl.
*G01P 3/04* (2006.01)
(52) U.S. Cl. ............................ 73/510; 73/509
(58) Field of Classification Search ............. 73/509, 73/510
See application file for complete search history.

(56) References Cited

U.S. PATENT DOCUMENTS

| | | | |
|---|---|---|---|
| 5,307,888 A | | 5/1994 | Urvoy |
| 5,819,206 A | | 10/1998 | Horton et al. |
| 5,854,622 A | * | 12/1998 | Brannon ............... 345/161 |
| 6,798,429 B2 | * | 9/2004 | Bradski ............... 345/156 |
| 7,271,795 B2 | * | 9/2007 | Bradski ............... 345/158 |
| 2002/0140666 A1 | * | 10/2002 | Bradski ............... 345/156 |
| 2003/0142065 A1 | | 7/2003 | Pahlavan |
| 2004/0012566 A1 | * | 1/2004 | Bradski ............... 345/158 |
| 2004/0027330 A1 | * | 2/2004 | Bradski ............... 345/158 |
| 2004/0196259 A1 | * | 10/2004 | Bradski ............... 345/158 |
| 2005/0037730 A1 | | 2/2005 | Montague |
| 2007/0178974 A1 | | 8/2007 | Masuyama et al. |

FOREIGN PATENT DOCUMENTS

GB    2045938 A    11/1980

OTHER PUBLICATIONS

International Search Report- PCT/US2007/064113, International Search Authority/EPO, Aug. 3, 2007 (2 pages).
Written Opinion PCT/US07/064113, International Search Authority European Patent Office, Sep. 16, 2008.

* cited by examiner

*Primary Examiner*—Hezron Williams
*Assistant Examiner*—Samir M Shah
(74) *Attorney, Agent, or Firm*—Andrea L. Mays; Shyam K. Parekh; Katherine Umpleby

(57) ABSTRACT

A method for measuring positional changes of an object, including rotation about any or all of three axes, using linear accelerometers. There is disclosed a method of using a linear accelerometer to integrate two other 3D linear accelerometers in order to measure and supply for further use six-dimensional information, that is, translation in three dimensions and rotation about three axes. Two linear accelerometer sensors are used to determine all but one of the variables in the six degrees of freedom. Output from a third accelerometer generates the data need to determine a sixth, rotational, degree of freedom. The need for a gyroscope for detecting changes in heading (i.e., yaw of azimuth) may therefore be avoided.

14 Claims, 6 Drawing Sheets

SENSOR-BASED ORIENTATION SYSTEM

CROSS-REFERENCE TO RELATED APPLICATIONS

The present application claims priority to U.S. Provisional Patent Application Ser. No. 60/783,196, entitled, "Sensor-based Orientation System" filed on Mar. 15, 2006, which is assigned to the assignee hereof and which is expressly incorporated herein by reference.

BACKGROUND

1. Field

The present disclosure relates generally to orientation systems, and more specifically to a method and apparatus for sensing roll, pitch and yaw in a moving body, in addition to linear translation of the body in three-dimensional space.

2. Background

There exists a large variety of sensors available for detecting or measuring physical conditions or phenomena. A type of sensor commonly deployed in many industrial, commercial, or scientific contexts is a linear accelerometer. By detecting the direction of Earth's gravity vector, a linear "3D" accelerometer can be used to measure the translation (linear movement without angular rotation) of an object, and also which can sense "tilt" (such as angular accelerations associated with "roll" or "pitch"), freefall, and shock. Accelerometers of differing types and sensitivities may function by exploiting any of a variety of physical phenomena, such as the rolling of a small ball, the shifting/flowing of a conductive or heavy liquid, the swinging of a pendulum, or other mechanical means of varying accuracy and sensitivity. More sophisticated known linear accelerometers may sense movement through the Earth's magnetic field, or exploit other magnetic or optical phenomena.

However, it presently is difficult or impossible to differentiate, using conventional, cost-effective linear accelerometers, between linear motion (acceleration relative to an ordinary Cartesian coordinate system) and the change in orientation of a device and a corresponding change (i.e. angular acceleration) in roll or pitch. A change in the "heading" or yaw of a moving object cannot be sensed by conventional linear accelerometers at all. Gyroscopes, which are comparatively expensive, complex and delicate, commonly serve as the means for sensing a shift or change in rotational freedom, such as the yaw, roll and pitch, of a moveable object. Normally, three gyroscopes are used, one per axis of rotation, albeit, the latest developments in micro-electromechanical systems (MEMS) technologies allowed the development of a two-axis gyroscope. There is therefore a need in the art for a method and means for reliably measuring movement of an object in all six degrees of freedom, including changes in yaw as well as roll and pitch, using relatively simple accelerometer sensors.

SUMMARY

Embodiments disclosed herein address the above stated needs by providing a process and apparatus for measuring movement in all six degrees of freedom for practically any moveable object. Three linear accelerometers generate all the data needed for such measurement. Two accelerometers provide the data needed to detect changes in position for two points associated with those accelerometers, while the third accelerometer, disposed non-collinearly to the first two, generates data adequate to gauge the change, if any, in the position or orientation of the imaginary axis connecting the first two accelerometers.

DETAILED DESCRIPTION

The presently disclosed method permits the orientation and linear motion of an object to be sensed and measured. It is contemplated that the disclosed methodologies will find beneficial application in a wide variety of fields and circumstances including, but not limited to, avionics and ground transportation, telecommunications, remote sensing and photography, electronic tracking and monitoring of persons or cargo, and the security of persons, products, and consumer electronics products.

The presently disclosed method permits the orientation and linear motion of an object to be sensed and measured. It is contemplated that the disclosed methodologies will find beneficial application in a wide variety of fields and circumstances including, but not limited to, avionics and ground transportation, telecommunications, remote sensing and photography, electronic tracking and monitoring of persons or cargo, the security of persons, products, and consumer electronics products.

By the presently disclosed method, the linear motion and three-dimensional orientation of a selected object can be reliably measured. The motion and positional data generated thereby can then be transmitted by any suitable means to other system components or processors. For example, a measure of an unwanted change in a three-dimensional position can be provided to, for example, an attitude control system to permit a deviation from proper orientation (e.g., with respect to vertical) to be rectified. Or, by way of further example, if the acceleration and orientation of an object are measured simultaneously and fall outside predetermined parameters, an alarm system may be signaled and actuated. In consumer electronics, the six-dimensional information can be used to control gaming devices such as a joystick, allow user interaction in terms of input and menu selection, and provide image stabilization for digital still and video cameras.

Figure 1:
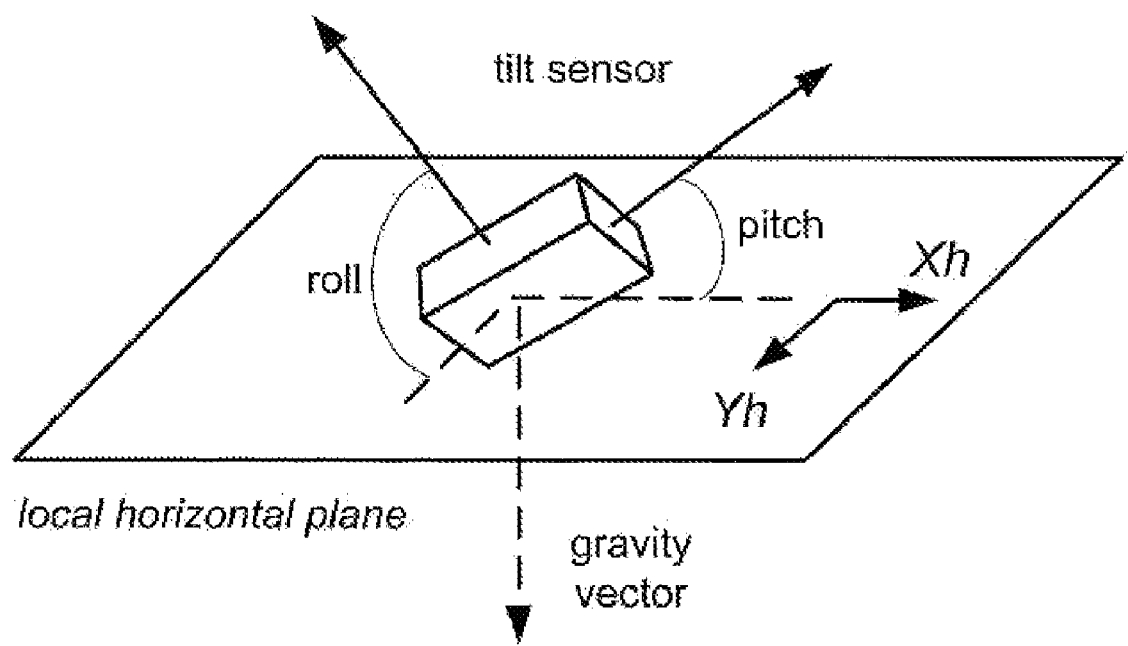
FIG. 1 is a perspective view of a prior art accelerometer or "tilt" sensor, shown in relation to a local horizontal plane and with selected coordinate axes depicted.

Linear accelerometers, in a variety of different types and functionalities, are widely used in a broad spectrum of scientific an industrial applications. Three-dimensional accelerometers are commonly available at a number of different levels of sophistication and expense, and are among the most widely used micro-electromechanical systems (MEMS) sensors. FIG. 1 shows a conventional linear accelerometer serving as a tilt sensor. The accelerometer sensor can sense linear motion (that is translation in any plane, such as the local horizontal plane); the translation can be measured with reference to at least two axes (e.g., $X_h$ and $Y_h$). Such an accelerometer also can offer a measure of an object's tilt (roll or pitch, as suggested in FIG. 1). Thus, with a single 3D accelerometer, an object's motion in Cartesian coordinate space (x,y,z) can be sensed, and the direction of gravity can be sensed to estimate the object's roll ($\tau$) and pitch ($\phi$). A marked advantage of the present method and apparatus is that a trio of such commonly available and relatively affordable 3D accelerometers can be functionally combined to sense changes in the sixth variable, that of yaw, also frequently referred to as azimuth or "heading" ($\psi$).

Figure 2:
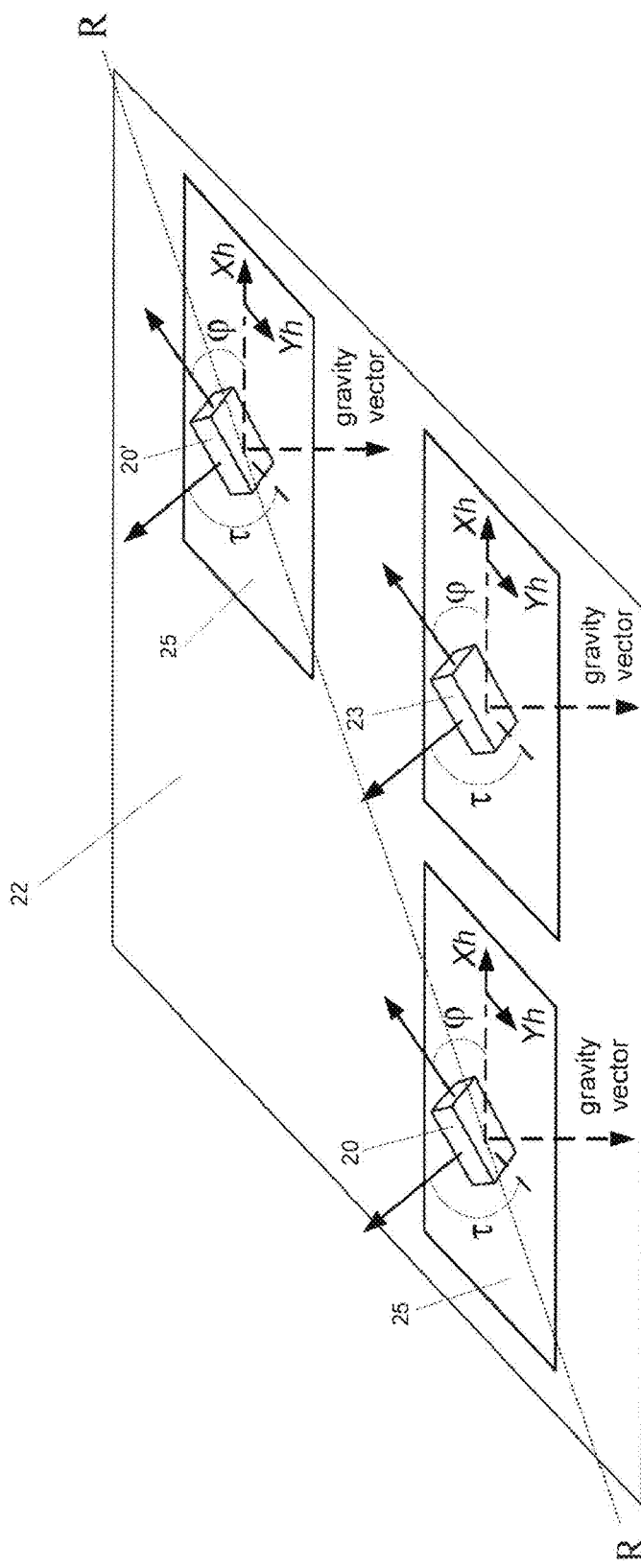
FIG. 2 shows an aspect of the present disclosure, there being three accelerometer sensors upon a metric board, for use in measuring accelerations in relation to six degrees of freedom of motion.

Reference is invited to FIG. 2. In accordance with the present disclosure, two preferably but not necessarily identical 3D accelerometers 20, 20' are deployed in spaced relation on a metric board 22 associated with the object of interest, such as an automobile, telecommunications, wireless or photographic device, aircraft, or the like. The precise disposition of the two accelerometers 20, 20' in three dimensional space is not critical, provided that their linear distance of separation is fixed, and significant relative to the distances and degrees of motion sought to be monitored. In one embodiment, the accelerometers 20, 20' are situated at approximately diagonally opposite corners of a planar board 22. Each accelerometer may be regarded to have a local horizontal plane 25, 25', which planes 25, 25' may be contained in or parallel to the metric board 22. The board 22 is secured aboard the object or device (not shown) whose translations and rotations are to be sensed and monitored.

This disclosure offers a method of integrating the output of the first 20 and second 20' accelerometers with a third accelerometer 23 to provide the sought "six-dimensional" data matrix (x, y, z, $\tau$, $\phi$, $\psi$). Because linear accelerometers provide second-order momentum measurements, the locomotion measurements taken by the accelerometers 20, 20' and 23 must be integrated once to obtain the rate of change (in linear or angular velocities), and then integrated a second time to obtain absolute measures, that is, of change in position or tilt.

Consideration of FIG. 2 suggests that the only degree of motion that is not fully detectable by two accelerometers 20, 20' alone is rotation about the imaginary axis R—R defined by the line connecting those two accelerometers 20, 20'. Depending upon the orientation of the board 22 in relation to the object of interest, such a rotation may correspond to change in roll ($\tau$), pitch ($\phi$) or yaw ($\psi$), but a two-sensor device is inadequate to detect reliably all three types of rotation.

Figures 3A, 3B:
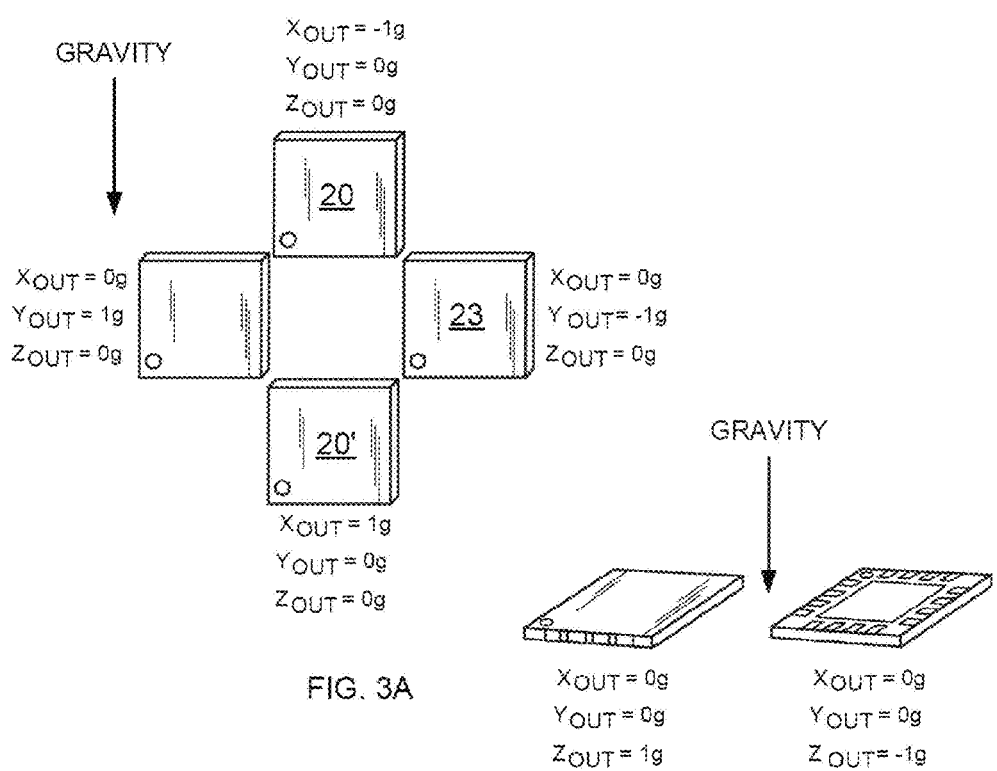
FIG. 3A shows an array of four vertically aligned accelerometer sensors and the output data corresponding to the axes of each sensor.
FIG. 3B shows two horizontally aligned sensors, one inverted relative to the other, also with corresponding output data.

FIG. 3A graphically illustrates the output response of accelerometer sensors verses orientation relative to gravity. If the individual orientation of each sensor is noted, the gravitational acceleration is measured with respect to each axis of sensitivity for each sensor in an array of sensors. Shown in the FIG. 3A is an array of four sensors (or, alternatively, a single sensor depicted at four different positions at different times), whose orientations are observable (note positions of white corner markers on sensors). The x-y coordinate planes (defined by the x-axis and v-axis of sensitivity) of the sensors are parallel to the gravity vector, so that the uppermost sensor indicates zero output except for the acceleration due to gravity along the x-axis. The lowermost sensor in the array likewise shows only the gravity acceleration, except that the acceleration measurement is output with an opposite "sense" due to the inversion of the x-axis relative to the uppermost sensor. The two side sensors of the array generate concordant outputs, with the gravity acceleration along the respective two parallel, but oppositely directed, y-axes of sensitivity. It should be noted that all sensor axes are by design perpendicular to each other and any misalignment results in acceleration measurement errors. For the discussion that follows it is assumed that the sensor axes are perfectly aligned and are perpendicular to each other and that the sensors themselves are positioned in plane 22 (not shown; see FIG. 2) in such a way that the x, y, z axes of sensor 20 are perfectly aligned with the x, y, z axes of sensors 20' and 23.

FIG. 3B illustrates how a single sensor will output data respecting the sensor's z-axis of sensitivity. In the lower right of the figure, a single sensor's x-y coordinate plane is normal to the gravity vector. Accordingly, the output corresponding to the x and y axes of sensitivity is zero, but the acceleration along the z-axis of sensitivity equals the gravity acceleration constant g, or −g if the sensor is inverted to reverse the directional "sense" of the sensor's z-axis of sensitivity.

Figure 5:
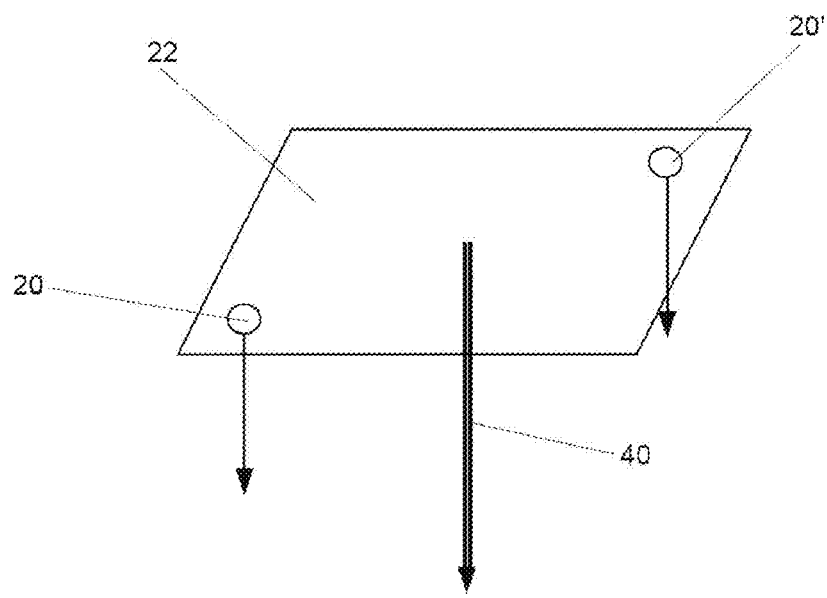
FIG. 5 illustrates the output senses of two accelerometer-type sensors on a metric board undergoing a linear translation.
Figure 6:
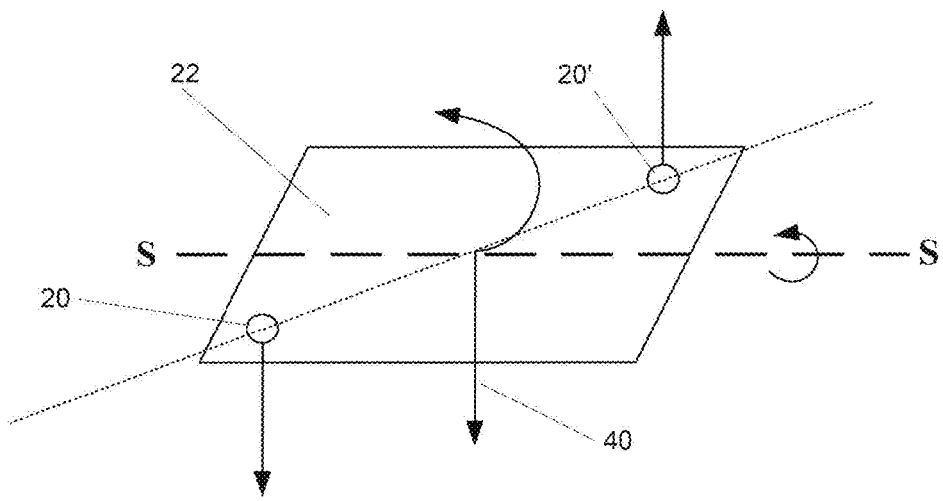
FIG. 6 illustrates the opposing output senses of two accelerometer-type sensors on a metric board undergoing a rotation about an axis S-S.

FIG. 5 suggests that two 3D accelerometers 20, 20' can sense linear movement, such as "drop" parallel to a z-axis 40 (perhaps the gravity vector). In such circumstance, the accelerometers 20, 20' move in the same direction along generally parallel vectors (indicated by directional arrows in the figure), and thus generate similar outputs. In contrast, and as indicated by FIG. 6, the two accelerometers 20, 20' can sense orientation (for example, respecting any given imaginary axis of rotation S-S), because they move along oppositely directed vectors and thus generate opposite outputs.

To overcome the sensory deficiencies of a two-accelerometer system, a third linear accelerometer 23 is provided. The third accelerometer sensor 23 is disposed at fixed separation distances from sensor number one 20 and from sensor number two 20', respectively and is located off the imaginary axis R-R defined by the location of sensors 20, 20' (i.e., the three sensors 20, 20' and 23 are within the same imaginary plane, but are not co-linearly arranged. The additional sensor component 23 permits the observation and differentiation of "six axis" movement; linear (x,y,z) and rotational ($\tau$,$\phi$,$\psi$). Thus, the three-sensor array shown in FIG. 2 can effectively detect and describe all six degrees of motion of the plane (e.g. the metric board 22) defined by the placement of the three accelerometers 20, 20' and 23.

Figure 4:
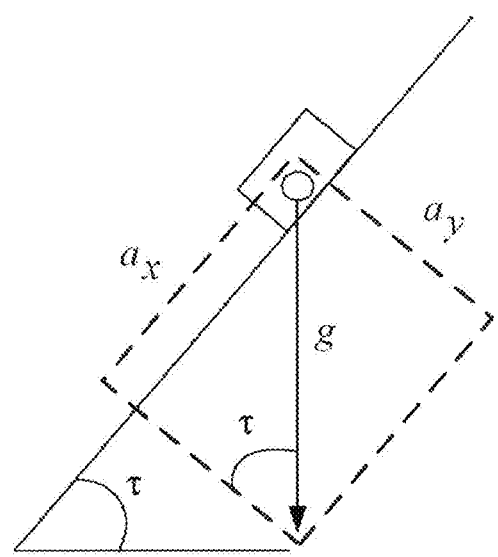
FIG. 4 is a geometric diagram illustrating the determination of a change in acceleration on the x-axis of a coordinate system corresponding to given angle of tilt $\tau$.

Because accelerometers sense the force of gravity depending on the orientation of the object mounting the accelerometer (FIG. 3A), the different axes of an apparatus, according to this disclosure, sense and report the measure of the gravitational force and any other acceleration experienced by the object. It should be noted that with respect to this invention the gravitational force is always present. As illustrated in FIG. 4, a tilt acceleration is determined from the product of the sine of an angle $\tau$ and the gravitational force. If, for example, an acceleration relative to the x-axis of sensitivity of an accelerometer 20, 20', or 23 is designated as ax, then sine $\tau$=ax/g, where g is the acceleration due to the gravity force (~9.8 m/s2). Accordingly, for one degree (1°) of tilt in the x axis, there is an acceleration change relative to the x-axis of $\Delta$ax =sin (1°) g ≈17.45 mg. Therefore, the quality of the accelerometer generated measurements has to be better than 17.45 mg if the tilt on the order of 1° is to be observed and reported.

Referring again to FIG. 5, each of the two 3D accelerometers (sensors 20 and 20') each has three axes of sensitivity (x, y, z). If the z axis 40 is aligned with the gravity vector, in the absence of any Movement, sensor 20 experiences and reports accelerations, relative to the axes of sensitivity, of 0 g, 0 g, and 1 g, respectively; sensor 20' experiences and reports similarly. If there is linear movement along the z-axis 40 only, then both sensors 20 and 20' report accelerations of 0 g, 0 g, and az+1 g, where az represents the acceleration due to the movement along the z-axis 40. Linear motion and accelerations relative to the other x- and y-axes are analyzed in the same conceptual framework.

Angular movement is also detected and evaluated. If rotation occurs about an axis S-S (which may or may not be parallel to one of a sensor's axes of sensitivity) as shown in FIG. 6, the two sensors 20 and 20' report changes having opposite "senses," as suggested by the straight directional arrows of FIG. 6. Rotation about axis S-S will cause sensor 20 to experience and report accelerations, relative to the sensor's axes of sensitivity, of 0 g, 0 g, and az+1 g, respectively. To the contrary, sensor number two 20' experiences and reports accelerations, relative to that sensor's axes of sensitivity, of 0 g, 0 g, and −az+1 g, respectively, where the acceleration along the z axis is subtracted from the gravitational acceleration. Notably, a combination of both rotation and linear motion will cause an imbalance in the magnitudes of the acceleration along the z-axis. So if the magnitudes of the respective accelerations az are not reported by the sensors 20 and 20' to be the same, the device indicates a combination of rotation and linear motion. Again, one of ordinary skill in the art will immediately appreciate that the same concept applies to rotation about other orthogonal axes.

Applying the foregoing concepts, and using the formula for acceleration due to tilt through an angle in $\tau$ with respect to a sensor's given axis of sensitivity (sine $\tau$=ax/g (or ay/g) and etc.)), sensors 20, 20' and 23 each generate an output signaling indicating how that particular sensor has moved linearly or rotationally during a selected time interval. As mentioned, the directions and magnitudes of the respective accelerometer sensor outputs may then be measured, and compared and contrasted, by a CPU to calculate the gross motion of the object whose position is to be monitored. The output from accelerometers 20 and 20' alone permit the calculation, using known algorithms, of the degree to which the gross object has undergone translational non-rotational movement through 3D space; further, because rotation about one selected axis can be detected and measured by the two sensors 20 and 20' generating outputs of opposing directional "sense," rotation in two degrees of freedom (e.g., "roll" and "pitch") in 3D space also may be calculated.

The third sensor 23, being located off the axis R-R "connecting" the first two sensors 20 and 20', generates the output data sufficient to determine whether the axis R-R itself has undergone a rotation—that is, whether there has been a rotational change in the unmeasured third degree of freedom (for example the "yaw" or "azimuth") of the metric board 22, and thus of the object of interest.

A method of monitoring changes in all six degrees of freedom (x, y, z, $\tau$, $\phi$, $\psi$) involves assigning initial coordinates ($X_0, Y_0, Z_0$) to each of the three accelerometer sensors 20, 20' and 23 at time zero ($t_0$) and to then compute changes in the coordinates based on any suitably selected coordinate system. According to the method, the 3D coordinates of each sensor 20, 20' and 23 are initialized, and the object of interest then permitted to undergo the motion to be monitored. The output of each of the accelerometer sensors 20, 20' and 23 is received and used as input into a double-integral equation to generate the positional change of each sensor relative to the selected coordinate system.

An algorithm for reckoning a positional change, that is, to determine coordinates associated with a single given sensor at a subsequent time $t_1$, will be $$(X_1, Y_1, Z_1) = (X_0, Y_0, Z_0) + \int\int (ax, ay, az)(t-t_0) \tag{1}$$

where $X_0$ is the x-axis coordinate of a particular sensor at time zero ($t_0$), $Y_0$ is the y-axis coordinate of the sensor, and $Z_0$ is the z-axis coordinate of the sensor, also at the time zero. The integration of the accelerations in relation to all three coordinate axes is a calculation that may be performed by a processing unit running a program within the programming skills of a person skilled in the art. The subsequent coordinates ($X_1$, $Y_1$, $Z_1$) associated with each of the other two sensors is computed by likewise running the algorithm of Equation (1), using as input the output data of the respective sensor. Since each sensor with the corresponding coordinates describes the 3D movement of a point located on the board 22 (and in general it takes three points to define a plane), the three sensors and their corresponding coordinates computed as a function of time describe the change in the position and the orientation of the board 22 during the measurement dwell defined as the difference $t_1-t_0$.

Figure 7:
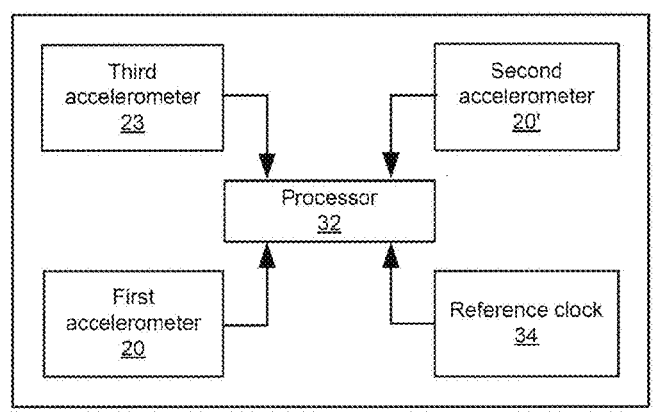
FIG. 7 is a simple schematic showing the operative connection between three accelerometer sensors and a clock and MPROC combination.

Reference is made to FIG. 7. Significant to the optimum performance of the method is the simultaneous, or near-simultaneous, read-out of the measurements from all the accelerometer sensors 20, 20' and 23. Simultaneous read-out may be received and recorded by means of a digital signal processor and suitable DRAM. In an alternative embodiment, the measurement signals may be received and "time stamped." Time-stamped data can subsequently be correlated for further processing, if required, and incorporation into any of a variety of known motion detection algorithms, such as those employed in navigation or image stabilization systems. FIG. 7 illustrates that the separate sensors 20, 20' and 23 may provide data to a processor 32 in operative association with a common clock 34 to provide coordinated "date stamping" of the data received separately from the sensors 20, 20' and 23. By having a single reference clock, accurate relative time stamping can be achieved. Processor 32 requests and receives acceleration measurement data from the sensors 20, 20' and 23. Because there may be relative delay in the sensor response, processor 32 assigns a time stamp to individual measurements from sensors 20, 20' and 23 according to the reference clock 34. These time stamps are then used to correlate the measurements and optionally to interpolate the individual accelerometer measurements from the sensors 20, 20' and 23 to a common time. Optionally, processor 32 may also perform some measurement processing such as low pass filtering the raw measurements to reduce the measurement noise, integrating raw sensor measurements, interpolating or any other function which may be deemed beneficial to motion detection and propagation.

For an example of the foregoing, an individual human may be considered as the object whose motion is to be monitored. Human motion may be estimated to be within the range of about 10 Hz. Accordingly, running the sensors 20, 20' and 23 at a 100 Hz update rate would produce measurements every 10 msec, at 10 times the bandwidth of the motion being measured and monitored. Time stamping therefore should be done with an accuracy of less than 5 msec to properly align the measurement from multiple sensors 20, 20' and 23. Notably, the absolute time is not critical, because any error therein will be common to the measurements from all the sensors. The higher the dynamics of the platform being tracked the higher sampling rate is needed to sense and describe the motion, therefore, the better time stamping is needed. But very preferably the same clock is used to time stamp measurements from different sensors.

Figure 8:
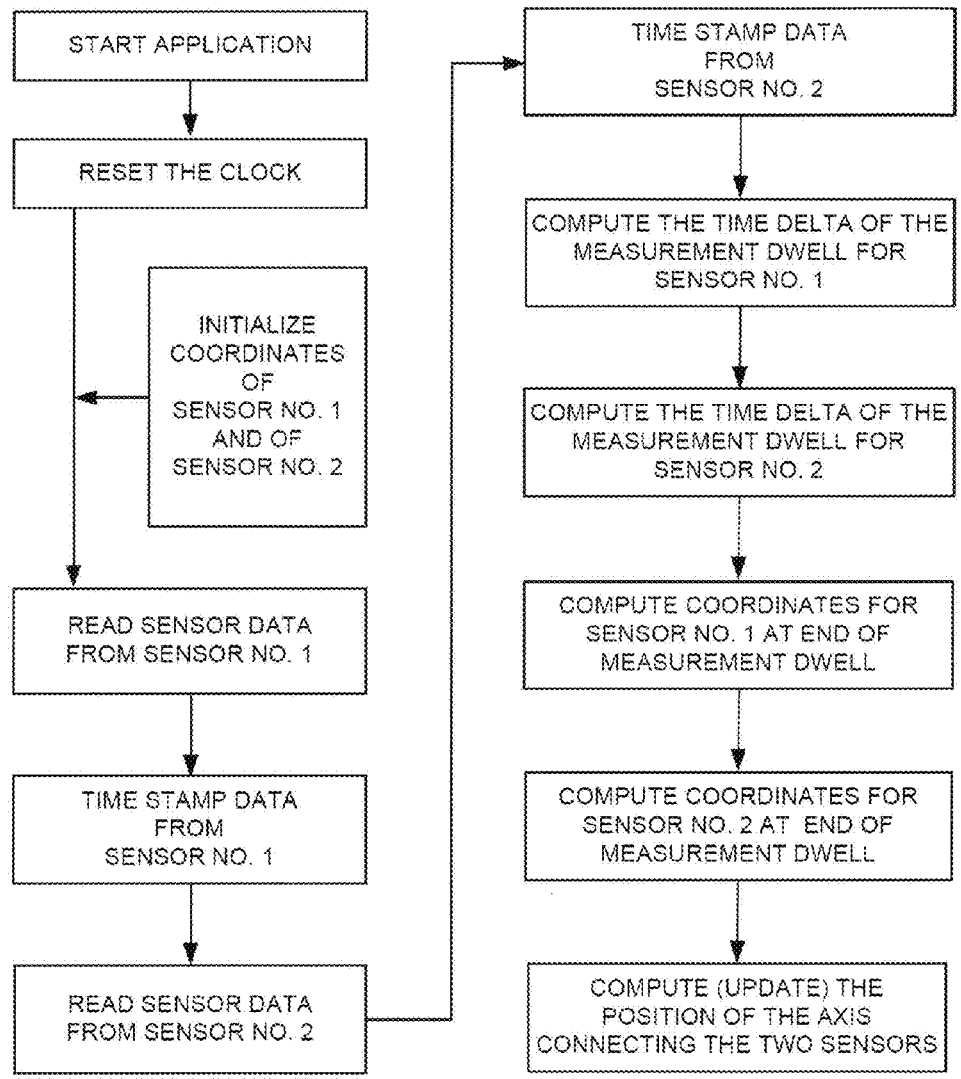
FIG. 8 is a flowchart depicting an aspect of the method of the present disclosure.

FIG. 8 offers the call flow for a typical application of the disclosed method, such as might be used, for example, in an image stabilization routine. Upon commencing the application, the clock 34 is reset to initialize the common timing for the system. Simultaneously with, or very shortly after, the resetting of the clock, at some selected time zero ($t_0$), the coordinates for all the sensors 20, 20' and 23 are initialized, e.g., sensor 20 coordinates are initialized to $(x, y, z)^1_0$, the coordinates of sensor 20' are initialized to $(x, y, z)^2_0$ and the coordinates for sensor 23 are initialized to $(x, y, z)^3_0$. The application runs, and the full angular and linear motion (if any) of sensor 20 is detected, measured and transmitted to the processor 32 whereby the data for sensor 20 is time-stamped and recorded. The complete motion (if any) of sensor 20' likewise is detected, measured and transmitted to the processor 32, and the received data for sensor 20' also is time-stamped and recorded. The measurement recording and time stamping are performed at a sampling rate controlled by processor 32.

Referring still to FIG. 8, it is seen that accurate data processing requires that the time required for obtaining the respective measurements is preferably accounted for. Accordingly, the processor 32 computes the time interval or "delta" for the measurement dwell for sensor number one 20, as well as the measurement dwell for sensor number two 20', during a time period (in which translational and/or rotational movement may be occurring). The measurement dwell is defined by the measurement sampling rate and is equal to $t_1-t_0$ where $t_0$ is the time stamp of a previous measurement and $t_1$ is the time stamp of the current measurement. The full observation period is made up of the dwell periods. The positional and rotational changes have to be integrated over the full observation period to account for any motion which transpired during this period of time. For example, at a 100 Hz sampling rate one hundred dwells each of 10 msec duration can be integrated to generate the change in the linear and rotational position of the object within one-second observation period.

The positional coordinates for sensor 20 are then calculated at a time $t_1$ using the Equation (1) hereinabove. The positional coordinates for sensor 20' are similarly computed.

Finally, the motion detection and measurement provided by sensor number three 23, can be processed likewise for six degrees of freedom, observation and processing. Any change in $(x, y, \tau, \phi\psi)$ is used to compute, update, and record the position of the plane 22 defined by the coordinates of the sensors 20, 20' and 23 permitting the complete determination of the "new" coordinates at time $t_1$ for the sensors 20, 20' and 23 (i.e., $(x, y, z)^1_1$, $(x, y, z)^2_1$ and $(x, y, z)^3_1$). This process is repeated while the motion needs to be observed for the underlying application. The new application may then be restarted with a clock re-set, and the coordinates for the sensors 20, 20' and 23 re-initialized, and the method repeated as desired.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for determining changes in orientation of an object in six degrees of freedom, comprising:

providing first and second linear accelerometers disposed on an imaginary axis relative to the object;

providing a third linear accelerometer disposed off the imaginary axis relative to the object;

measuring, with the first linear accelerometer, a first linear movement of the object in relation to an x-y-z coordinate system;

measuring, with the second linear accelerometer, a second linear movement of the object in relation to the x-y-z coordinate system;

measuring, with the third linear accelerometer, a third linear movement of the object in relation to the x-y-z coordinate system;

determining, with measurements from the first, second and third linear accelerometers, a change in position of the object; and determining, with measurements from the first, second and third linear accelerometers, a change in orientation of the object.

2. The method of claim 1, wherein the act of determining the change in orientation comprises comparing respective outputs of the first and second linear accelerometers relative to an accelerometer axis of sensitivity.

3. The method of claim 1, wherein the act of determining the change in orientation comprises comparing the respective outputs of the first and second linear accelerometers relative to each accelerometer axis of sensitivity.

4. The method of claim 1, comprising the further act of calculating a tilt acceleration relative to an axis of sensitivity of at least one of the accelerometers.

5. The method of claim 1, comprising the further act of detecting an imbalance in respective magnitudes of acceleration of the first and second linear accelerometers along an axis of the x-y-z coordinate system.

6. The method of claim 1, further comprising:
assigning initial coordinates $(X_0, Y_0, Z_0)$, in the x-y-z coordinate system, to each of the accelerometers at a first time; and
computing changes from the initial coordinates for each of the accelerometers between the first time and a second time.

7. The method of claim 6, wherein the act of computing changes from the initial coordinates for each of the accelerometers comprises:
receiving data from each of the accelerometers; and
inputting the data from each of the accelerometers into the equation $$(X_1, Y_1, Z_1) = (X_0, Y_0, Z_0) + \int\int (ax, ay, az)(t-t_0)$$

wherein a is acceleration relative to an axis, $X_0$ is the x-coordinate of the accelerometer at the first time, $Y_0$ is the y coordinate of the accelerometer at the first time, $Z_0$ is the z-coordinate of the accelerometer at the first time, and $(X_1, Y_1, Z_1)$ defines the position of the accelerometer in the x-y-z coordinate system at the second time.

8. An apparatus for determining changes in orientation of an object in six degrees of freedom, comprising:
a first linear accelerometer;
a second linear accelerometer positioned with respect to the first linear accelerometer to define an imaginary axis;
a third linear accelerometer disposed off the imaginary axis;
means for measuring, with the first and second linear accelerometers, the linear movement of the object in relation to an x-y-z coordinate system;
means for measuring, with the third linear accelerometer, the linear movement of the object in relation to the x-y-z coordinate system; and
a processing unit to determine, from the measurements from the first, second and third linear accelerometers, a change in a position and an orientation of the apparatus.

9. The apparatus of claim 8, wherein the means for measuring, with the first and second linear accelerometers, the linear movement of the object comprises means for comparing respective outputs of the first and second linear accelerometers relative to an accelerometer axis of sensitivity.

10. The apparatus of claim 8, wherein the processing unit calculates at least one tilt acceleration relative to at least one axis of sensitivity of the accelerometers.

11. The apparatus of claim 10, wherein the processor further detects an imbalance in respective magnitudes of acceleration of the first and the second linear accelerometers along an axis of the x-y-z coordinate system.

12. The apparatus of claim 11, wherein the processor assigns initial coordinates, in the x-y-z coordinate system, to each of the accelerometers at a first time, and computes changes in coordinates of each accelerometer between the first time and a second time.

13. The apparatus of claim 12, wherein the processor receives data from each of the accelerometers, and calculates with a double integral equation the positions of the accelerometers in the x-y-z coordinate system at the second time.

14. A computer program product for enabling a computer to determine changes in orientation of an object in six degrees of freedom comprising:
software instructions for enabling the computer to perform predetermined operations; and
a computer readable storage medium bearing the software instructions;
the predetermined operations including:
providing first and second linear accelerometers disposed on an imaginary axis relative to the object;
providing a third linear accelerometer disposed off the imaginary axis relative to the object;
measuring, with the first linear accelerometer, a first linear movement of the object in relation to an x-y-z coordinate system;
measuring, with the second linear accelerometer, a second linear movement of the object in relation to the x-y-z coordinate system;
measuring with the first and second linear accelerometers the annular rotation of the object in relation to two axes of rotation; and
measuring with the third linear accelerometer, a third linear movement of the object in relation to the x-y-z coordinate system;
determining, with measurements from the first, second and third linear accelerometers, a change in positon of the object; and
determining, with measurements from the first, second and third linear accelerometers, a change in orientation of the object,
wherein the computer determines changes in orientation of the object in six degrees of freedom.

* * * * *

UNITED STATES PATENT AND TRADEMARK OFFICE
CERTIFICATE OF CORRECTION

PATENT NO. : 7,533,569 B2  
APPLICATION NO. : 11/686945  
DATED : May 19, 2009  
INVENTOR(S) : Sheynblat Page 1 of 1

It is certified that error appears in the above-identified patent and that said Letters Patent is hereby corrected as shown below:

Column 9, line 32, claim 6: "$(X_o, Y_o, Z_o)$," to read as --$(X_0, Y_0, Z_0)$,--

Column 9, line 45, claim 7: "$X_o$" to read as --$X_0$--

Column 9, line 46, claim 7: "$Y_o$" to read as --$Y_0$--

Column 9, line 47, claim 7: "$Z_o$" to read as --$Z_0$--

Column 10, line 47, claim 14: "annular rotation" to read as --angular rotation--

Column 10, line 53, claim 14: "in positon" to read as --in position--

Signed and Sealed this  
Nineteenth Day of July, 2011

David J. Kappos  
*Director of the United States Patent and Trademark Office*